Feb. 14, 1956  D. L. MARKUSEN  2,734,703
FLIGHT PATH CONTROL APPARATUS
Filed Dec. 24, 1951
FIG. 1
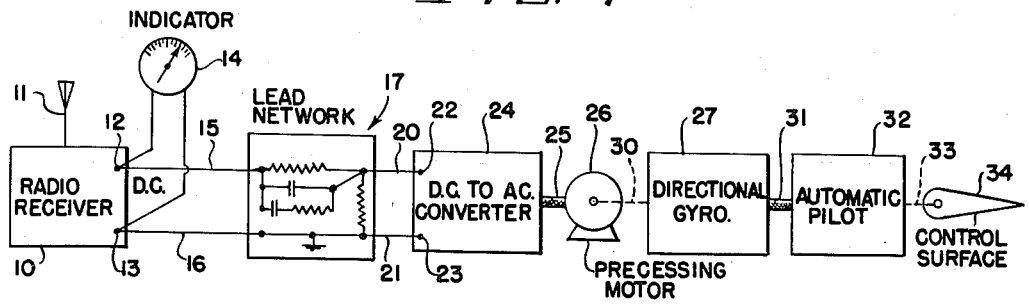
FIG. 2
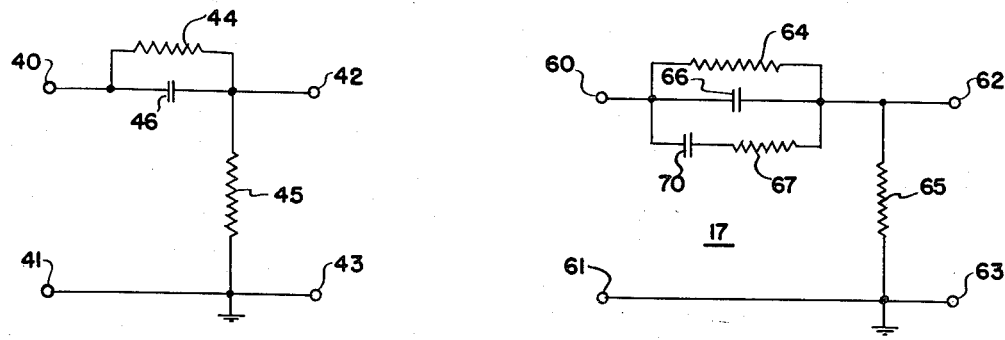
FIG. 3
FIG. 4
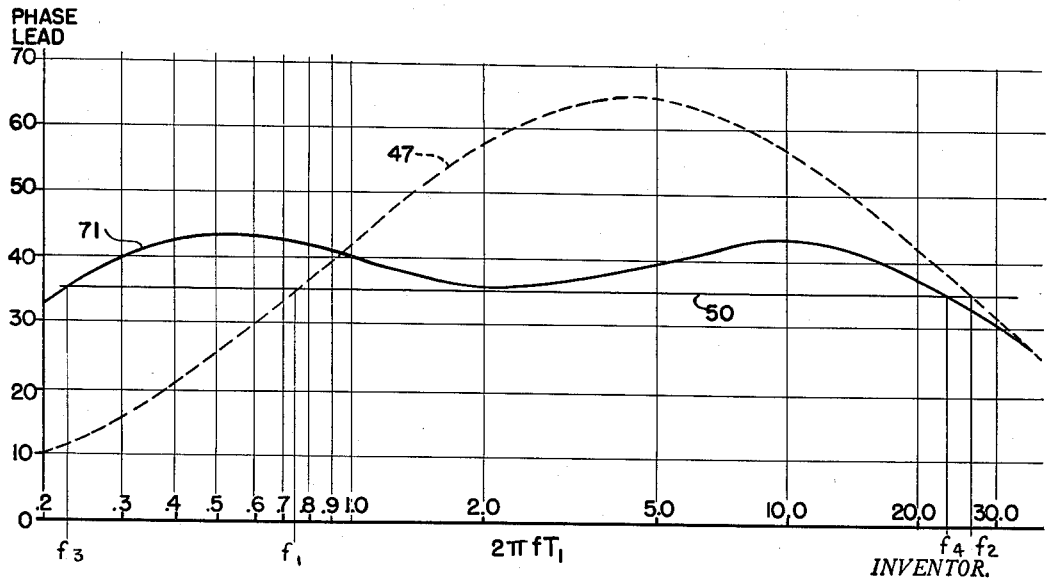
INVENTOR.
DAVID L. MARKUSEN
BY
George H. Fisher
ATTORNEY United States Patent Office 2,734,703
Patented Feb. 14, 1956

2,734,703

FLIGHT PATH CONTROL APPARATUS

David L. Markusen, Minneapolis, Minn., assignor to Minneapolis-Honeywell Regulator Company, Minneapolis, Minn., a corporation of Delaware Application December 24, 1951, Serial No. 263,099

7 Claims. (Cl. 244—77)

This invention relates to the field of aeronautics, and more particularly to flight path control apparatus for dirigible aircraft.

Flight path control may be defined as the regulation of the flight of an aircraft so that it moves along a predetermined path with respect to the ground. The path is usually indicated by the center line of a convergent radio beam, and signals from radio receiving apparatus carried by the craft are supplied through a beam signal coupler to an automatic pilot, thus regulating the heading of the craft to cause it to seek and follow the center of the beam.

In a typical case, the output of the radio receiver is a D. C. signal which is proportional to the angular displacement of the craft from the course center, the angle being measured at the radio transmitter. This means that the D. C. signal is the same whether a craft is two miles away from the transmitter and 400 feet from the center of the beam, or twenty-five miles away from the transmitter and 5,000 feet from the center of the beam. However, the signal gradient for a craft having a given airspeed and lateral component of motion is much steeper when the craft is closer to the transmitter than when it is far away. It is also true that the D. C. signal per linear unit of lateral displacement of the craft from the desired path varies inversely with distance from the transmitter.

The D. C. signal is supplied to the beam signal coupler, which passes it through a lead network and then converts it into an A. C. signal for use in controlling the heading of the craft through its automatic pilot. One known method of doing this is taught in Mosely Patent 2,423,336. According to the present invention the A. C. signal is used to precess a directional gyroscope comprising a portion of the automatic pilot: the latter is accordingly adjusted to change the bank angle of the craft. The angular movement in azimuth, or change in heading, resulting therefrom is found to be proportional to the time integral of the bank angle, and results in lateral movement of the craft toward the center of the beam in proportion to the time interval of the heading change.

As the lateral movement takes place, the radio signal changes and the signal to the automatic pilot is changed accordingly. The overall system is thus one in which the output is fed back into the input, and the stability of such a system can be studied by the methods developed for feedback amplifiers and closed cycle servo systems. Because of the large inertia of the craft, the significant error frequencies are very low.

Since the flight path control apparatus has two integrations, it is unstable unless modified, because each integration results in a phase lag of 90 degrees, and the total phase shift of —180 degrees results in an inherently unstable system. This means that, instead of following the center of the beam, the craft "hunts" or oscillates back and forth across it, the frequency of the oscillation or "error frequency" being determined by characteristics of the entire apparatus including the craft. The presence of "noise" or spurious variations in the error signal supplied by the radio receiver serves to complicate the apparatus still further, and requires the use of a lower system gain—that is, a smaller change in bank angle resulting from any particular radio signal—than could otherwise be used.

The apparatus is stabilized by the lead network in the beam signal coupler. By suitable selection of components, such a network may be made to give a phase lead for signals having components in any desired range of frequencies. As long as the phase angle introduced by the lead network reduces the total phase lag of the system to substantially less than —180 degrees, the system is stable: in practice it is found that a phase lag of —140 degrees can be tolerated. The phase lag resulting from the double integration is constant for all frequencies, but it is only within a limited range of frequencies that a resistance-capacitance lead network gives a suitably large phase lead. The system with the lead network may thus be said to be only conditionally stable—that is, stable within a certain range of frequencies determined by the constants of the lead network. Nevertheless it does result in stable operation of the system on the flight path over a predictable range of frequencies, which are determined primarily by beam width for a craft following the beam.

The problem is not new with the present applicant, and partial solutions have heretofore been suggested, using very simple lead networks and feeding the resulting coupler signals to the turn controlling channels of the automatic pilot, either solely, or in combination with other signals to precess the directional gyroscope or to reset the selected heading of the craft. All the prior arrangements suffer from the disability of operating stably only over a very restricted length of radio beam, and from complexity of circuitry. The present invention constitutes a great simplification of prior arrangements, since its signal need be fed only to the precessing motor of the directional gyroscope, and since the useful phase shift in the new lead network here disclosed extends over a far greater range of frequencies than in any known arrangement, thus making the flight path control stable and hence useful over a far greater range of beam widths.

It is an object of the invention to provide improved beam following apparatus for dirigible aircraft.

It is another object of the invention to provide servo apparatus having a greatly increased range of stable operating frequencies.

Another object of the invention is to provide a lead network having a wide, flat frequency response curve instead of the usual peaked curve.

A further object of the invention is to provide aircraft control apparatus in which a signal proportional to departure of the aircraft from a desired path is applied to the network just described, and the output thereof is used to control the bank angle of the craft.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1 is a schematic showing of a complete installation according to the present invention;

Figure 2 is a wiring diagram illustrative of simple lead networks known in the prior art;

Figure 3 is a wiring diagram considerably enlarged of the lead network comprising the subject matter of the present invention; and Figure 4 is a diagram illustrative of the mode of operation of the prior art and the present lead networks.

As shown in Figure 1, the airborne equipment used in the practice of the present invention includes a radio receiver 10 having a receiving antenna 11 and supplying at a pair of output terminals 12 and 13 a unidirectional signal which varies in magnitude and reverses in polarity with variation in the amount and reversal in the sense of the displacement of the aircraft from the center of a beam. This signal is applied to a center-zero indicator 14 which is used to visually assist the human pilot in following the beam, and is also applied through a pair of conductors 15 and 16 to a lead network 17 shown more clearly in Figure 3. The output of network 17 is applied through conductors 20 and 21 to the input terminals 22 and 23 of a D. C.-to-A. C. converter 24. Converter 24 energizes, through a suitable cable 25, the precession motor 26 of a directional gyroscope 27, the mechanical connection between motor 26 and gyroscope 27 being indicated at 30. Gyroscope 27 supplies a signal through a suitable cable 31 to the automatic pilot 32 of the craft, which acts through a mechanical connection 33 to position the ailerons 34 of the craft, and thus change its bank angle. As is well known, the heading of the craft is most satisfactorily controlled by operation of ailerons, although simultaneous provision of a coordinating signal to the rudder of the craft is also known and may be used if desired.

An embodiment of lead network 17 which was used in the prior art is illustrated in Figure 2. The network is shown to comprise a pair of input terminals 40 and 41, a pair of output terminals 42 and 43, a pair of resistors 44 and 45 having resistances $R_1$ and $R_2$, and a capacitor 46 having a capacitance $C_1$. Resistor 45 is connected between output terminals 42 and 43, and terminals 41 and 43 are connected together and grounded. Connected between input terminal 40 and output terminal 42 is a parallel circuit made up of resistor 44 and capacitor 46.

The dotted curve 47 in Figure 4 is a semi-logarithmic plot of phase lead in this network for a range of values of the non-dimensionalized quantity $2\pi f T_1$, $f$ being the error frequency and $T_1$ having the value $R_1 C_1$. In this curve, frequency increases from left to right, and phase lead increases from bottom to top. It will be evident that the form of the curve is that of a simple resonance curve, and that the phase lead exceeds an abitrarily selected value indicated by the line 50 for a range of frequencies extending between $f_1$ and $f_2$.

Figure 3 is an enlarged wiring diagram of lead network 17. The resemblance between this network and the network shown in Figure 2 is obvious, and emphasizes the simplicity of the change by which the drastic improvement in the operation of this system is brought about. In Figure 3, network 17 is shown to comprise a pair of input terminals 60 and 61, a pair of output terminals 62 and 63, resistors 64, 65, and 67 having resistances $R_1$, $R_2$, and $R_3$, and capacitors 66 and 70 having capacitances $C_1$ and $C_2$ all respectively. Input terminal 61 and output terminal 63 are connected together and grounded. Resistor 65 is connected between output terminals 62 and 63. Connected between input terminals 60 and 62 is a complex parallel circuit including as branches resistor 64, capacitor 66, and the series circuit including resistor 67 and capacitor 70. Schematically, then, the difference between the structure shown in Figure 3 and that shown in Figure 2 is the addition of the last mentioned series circuit.

The difference in operation resulting from this simple change in the circuit is illustrated clearly in Figure 4, where solid line 71 is a plot of phase angle lead against the non-dimensionalized quantity $2\pi f T_1$ for the network of Figure 3. It will be apparent that the phase lead exceeds the arbitrary value indicated by the line 50 over a range of frequencies extending from $f_3$ to $f_4$, which is nearly an octave greater than that available in the simple lead network of Figure 2. The general configuration of curve 71 differs from that of curve 47 in more closely resembling the resonance curve of a double-tuned circuit, in that it has two widely spaced, relatively low peaks with a somewhat lower portion between them.

The importance of the apparently slight increase in $f_3-f_4$ over $f_1-f_2$ will be appreciated when it is pointed out that for each octave of frequency range gained, the apparatus remains stable for approximately twice the flight distance.

The determination of the constants for Figure 3 will now be explained. Let $Z=$ impedance between terminals 60 and 62 of Figure 3. Then $$\frac{1}{Z}=\frac{1}{R_1}+j\omega C_1+\frac{1}{R_3+\frac{1}{j\omega C_2}}$$

$$=\frac{1}{R_1}+j\omega C_1+\frac{j\omega C_2}{1+j\omega C_2 R_3}$$

$$=\frac{1+j\omega C_2 R_3+j\omega C_1 R_1+j^2\omega^2 C_1 C_2 R_1 R_3+j\omega C_2 R_1}{R_1(1+j\omega C_2 R_3)} \quad (1)$$

Now if $e_i$ is the voltage on terminals 60 and 61 and $e_0$ is that on terminals 62 and 63, $$\frac{e_0}{e_i}=\frac{R_2}{R_2+Z}=\frac{\frac{R_2}{Z}}{\frac{R_2}{Z}+1}$$

$$=\frac{R_2[1+j\omega C_2 R_3+j\omega C_1 R_1+j^2\omega^2 C_1 C_2 R_1 R_3+j\omega C_2 R_1]}{R_2[1+j\omega C_2 R_3+j\omega C_1 R_1+j^2\omega^2 C_1 C_2 R_1 R_3+j\omega C_2 R_1]+(1+j\omega C_2 R_3)R_1}$$

$$=\frac{1-\omega^2 C_1 C_2 R_1 R_3+j\omega(C_2 R_3+C_1 R_1+C_2 R_1)}{1+\frac{R_1}{R_2}-\omega^2 C_1 C_2 R_1 R_3+j\omega\left(C_2 R_3+C_1 R_1+C_2 R_1+\frac{C_2 R_1 R_3}{R_2}\right)} \quad (2)$$

$$=\frac{1-\omega^2 T_1 T_3+j\omega(T_3+T_2)}{N-\omega^2 T_1 T_3+j\omega(NT_3+T_2)} \quad (3)$$

where $T_1=R_1 C_1$, $T_2=R_1(C_1+C_2)$, $T_3=R_3 C_2$, and $$N=\frac{R_1}{R_2}+1$$

now let $$\frac{T_2}{T_1}=K \text{ and } \frac{T_3}{T_1}=MK$$

Then $$\frac{e_0}{e_i}=\frac{1-\omega^2 T_1^2 MK+j\omega T_1 K(M+1)}{N-\omega^2 T_1^2 MK+j\omega T_1 K(MN+1)} \quad (4)$$

The curve 71 of Figure 4 is for the case of Equation 4 where components are so selected that $K=4$, $M=0.22$ and $N=20$. A greater maximum phase lead can be obtained over a less extended frequency range, when components are chosen so that $K=2$, $M=0.24$ and $N=20$. Both arrangements are useful.

From the foregoing description it will be apparent that I have invented an improved flight path control apparatus which is capable of stable operation over a far greater range of error frequencies, which is to say beam widths, than has heretofore been approached, and that the novel lead network comprising an important inventive contribution of the overall system is essential to its proper operation.

Numerous objects and advantages of the invention have been set forth in the foregoing description, together with details of the structure and function of the invention, and the novel features thereof are pointed out in the appended claims. The disclosure, however, is illustrative only, and I may make changes in detail within the principle of the invention to the full extent indicated by the broad general meaning of the terms in which the claims are expressed.

I claim as my invention:

1. In control apparatus, a closed servo system including means for controlling a first condition in response to deviation, from a predetermined value, of a second condition which is proportional to the second integral of said first condition, thus tending to introduce a phase lag of 180 degrees into said system and to render said system unstable at all error frequencies; and means including a lead network in said first named means for introducing a phase lead, for error frequencies within a predetermined wide range, sufficient to render said system stable, said network comprising a simple parallel circuit including a first resistor and a first capacitor, a first series circuit including a second resistor and a second capacitor, means connecting said first series circuit in parallel with said simple parallel circuit to comprise a complex parallel circuit, a third resistor, means connecting said third resistor and series with said complex parallel circuit to comprise a complex series circuit, input terminals connected to the ends of said last named circuit, and output terminals connected to the ends of said third resistor.

2. In flight path control apparatus, a closed servo system including means for controlling the bank angle of an aircraft in response to deviation, from a predetermined value, of the lateral position of the craft, which is proportional to the second integral of said bank angle, thus introducing a phase lag of 180 degrees into said system and rendering said system unstable at all error frequencies; means including a lead network in said first named means for introducing a phase lead, for error frequencies within a predetermined wide range, sufficient to render said system stable, said network comprising a simple parallel circuit including a first resistor and a first capacitor, a first series circuit including a second resistor and a second capacitor, means connecting said first series circuit in parallel with said simple parallel circuit to comprise a complex parallel circuit, a third resistor, means connecting said third resistor in series with said complex parallel circuit to comprise a complex series circuit, input terminals connected to the ends of said last named circuit, and output terminals connected to the ends of said third resistor; means applying to said input terminals a voltage proportional to said lateral displacement; and means for controlling the bank angle of the craft in accordance with the voltage appearing at said output terminals.

3. Apparatus of the class described comprising, in combination: a simple parallel circuit including a first resistor and a first capacitor; a first series circuit including a second resistor and a second capacitor; means connecting said first series circuit in parallel with said simple parallel circuit to comprise a complex parallel circuit; a third resistor; means connecting said third resistor in series with said complex parallel circuit to comprise a complex series circuit; input terminals connected to the ends of said complex series circuit; output terminals connected to the ends of said third resistor; means energizing said input terminals in accordance with the lateral displacement of an aircraft from a desired path; and means controlling the bank angle of the craft in accordance with the signal appearing at said output terminals.

4. A servo system including: means for controlling a first condition in response to deviation, from a predetermined value, of a second condition which is indicative of need for change in the first condition, but which tends at all error frequencies to introduce a phase lag of 180° into the system and therefore to render the system unstable; and means including a lead network in said first named means for introducing a compensating phase lead, for error frequencies within a predetermined wide range, sufficient to render said system stable; said network comprising first and second capacitors; first, second and third resistors, and means interconnecting said capacitors and resistors so that the transfer function of said network is $$\frac{1-\omega^2 C_1 C_2 R_1 R_3 + j\omega(C_2 R_3 + C_1 R_1 + C_2 R_1)}{1+\frac{R_1}{R_2}-\omega^2 C_1 C_2 R_1 R_3 + j\omega\left(C_2 R_3 + C_1 R_1 + C_2 R_1 + \frac{C_2 R_1 R_3}{R_2}\right)}$$

where $C_1$ and $C_2$ are the capacitances of said capacitors, $R_1$, $R_2$, and $R_3$ are the resistances of said resistors, and $\omega$ is the frequency of the signal applied to said network.

5. A servo system including: means for controlling a first condition in response to deviation, from a predetermined value, of a second condition which is indicative of need for change in the first condition, but which tends at all error frequencies to introduce a phase lag of 180° into the system and therefore to render the system unstable; and means including a lead network in said first named means for introducing a compensating phase lead, for error frequencies within a predetermined wide range, sufficient to render said system stable; said network comprising first and second resistors and first and second capacitors, the time constant of said first capacitor and said first resistor being $T_1$, the time constant of said first resistor and said first and second capacitors being $T_2$, and the time constant of said second resistor and said second capacitor being $T_3$; a third resistor; the ratio of said first resistor to said third resistor being $N-1$; and means interconnecting said resistors and capacitors to provide a network having the transfer function $$\frac{1-\omega^2 T_1^2 MK + j\omega T_1 K(M+1)}{N-\omega^2 T_1^2 MK + j\omega T_1 K(MN+1)}$$

where $K=T_2/T_1$, $MK=T_3/T_1$, and $\omega$ is the frequency of the signal applied to said network.

6. A servo system including: means for controlling a first condition in response to deviation, from a predetermined value, of a second condition which is indicative of need for change in the first condition, but which tends at all error frequencies to introduce a phase lag of 180° into the system and therefore to render the system unstable; and means including a lead network in said first named means for introducing a compensating phase lead, for error frequencies within a predetermined wide range, sufficient to render said system stable; said network comprising first and second resistors and first and second capacitors, the time constant of said first capacitor and said first resistor being $T_1$, the time constant of said first resistor and said first and second capacitors being $T_2$, and the time constant of said second resistor and said second capacitor being $T_3$; a third resistor; the ratio of said first resistor to said third resistor being $N-1$; and means interconnecting said resistors and capacitors to provide a network having the transfer function $$\frac{1-\omega^2 T_1^2 MK + j\omega T_1 K(M+1)}{N-\omega^2 T_1^2 MK + j\omega T_1 K(MN+1)}$$

where $K=T_2/T_1$, $MK=T_3/T_1$, and $\omega$ is the frequency of the signal applied to said network, said resistors and capacitors being so chosen that $K=4$, $M=0.22$, and $N=20$.

7. A servo system including: means giving a signal in response to deviation of a first condition from a predetermined value; means for controlling, in accordance with an input signal, a second condition any variation in which changes the first condition, said controlling means having the characteristic at all error frequencies of introducing a phase lag of 180° between said input signal and the control resulting therefrom, so that the servo system is rendered unstable; a lead network including a plurality of capacitors, a plurality of resistors, and means for interconnecting said capacitors and said resistors to comprise a network having a phase lead of at least 36° and not more than 44° over substantially a range of 100 to 1 in the product $\omega T$, where $\omega$ is proportional to the error frequency and T is the time constant of one of said capacitors and one of said resistors; and means for connecting said network between said responsive means and said controlling means in such a fashion that said signal comprises the input to said network and the output from said network comprises the input signal to said controlling means, so that said network introduces into said system a compensating phase lead, for error frequencies within a predetermined wide range, sufficient to render said system stable.

References Cited in the file of this patent

UNITED STATES PATENTS

| | | |
|---|---|---|
| 1,961,334 | Burton | June 5, 1934 |
| 2,384,263 | Schlesinger | Sept. 4, 1945 |
| 2,423,336 | Moseley | July 1, 1947 |
| 2,446,567 | White et al. | Aug. 10, 1948 |
| 2,548,278 | Wirkler | Apr. 10, 1951 |

OTHER REFERENCES

Servomechanism-Fundamentals by Laur, Lesnick and Watson; copyright 1947, pages 146–154.